United States Patent [19]

Futterer

[11] 4,125,791
[45] Nov. 14, 1978

[54] STATOR FOR AN ELECTRICAL MACHINE

[75] Inventor: Bodo Futterer, Lucerne, Switzerland

[73] Assignee: Interelectric AG, Sachseln, Switzerland

[21] Appl. No.: 739,264

[22] Filed: Nov. 5, 1976

[30] Foreign Application Priority Data

Nov. 11, 1975 [DE] Fed. Rep. of Germany ....... 2550640

[51] Int. Cl.² .............................................. H02K 21/26
[52] U.S. Cl. ..................................... 310/154; 310/266
[58] Field of Search ............... 310/152, 159, 156, 266, 310/67

[56] References Cited

U.S. PATENT DOCUMENTS

| 2,952,788 | 9/1960 | Völkerling et al. | 310/266 |
| 3,237,036 | 2/1966 | König | 310/266 |
| 3,549,923 | 12/1970 | Kurakin et al. | 310/154 X |
| 3,793,548 | 2/1974 | Faulhaber | 310/154 X |

OTHER PUBLICATIONS

*IBM Tech. Disclosure Bulletin*, vol. 15, No. 11, 4/73, pp. 3481-3482.

*Primary Examiner*—Donovan F. Duggan
*Attorney, Agent, or Firm*—Frederick E. Bartholy

[57] ABSTRACT

A stator for an electrical machine, comprising an outer ferromagnetic flux return ring, a permanent magnet system arranged inside the flux return ring, and a face plate supporting the flux return ring and the permanent magnet system. The latter comprises at least four permanent magnets, each of which is shaped cylindrically at its outer surface, and an equal number of magnetically conductive link means, each of which abuts the inner surface of two adjacent permanent magnets. The link means serve to support the permanent magnets and may be bonded to the same. The stator is easy to manufacture with a low toleranced air gap and is of a rigid construction.

2 Claims, 4 Drawing Figures

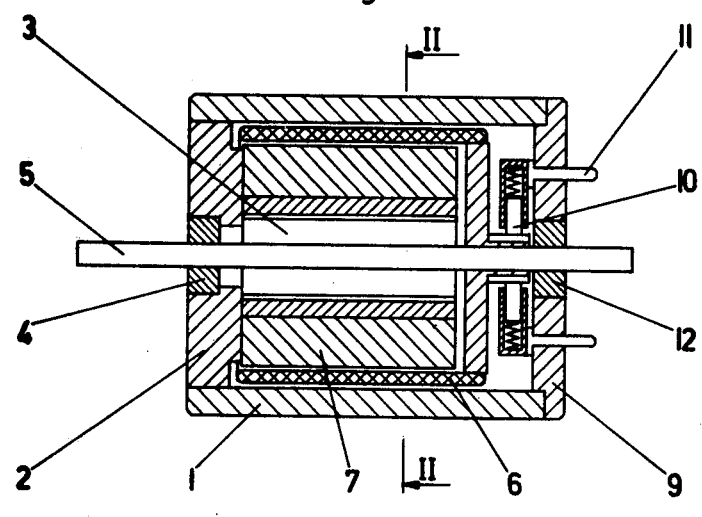
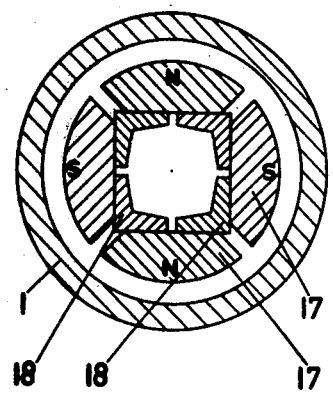
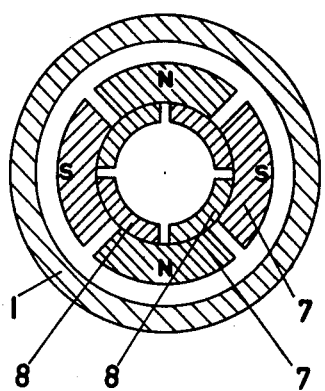

STATOR FOR AN ELECTRICAL MACHINE

BACKGROUND OF THE INVENTION

Stators are already known in the art, wherein the permanent magnet system is formed by a single cylindrical permanent magnet which is provided with a bore and which is radially magnetized. Such a stator, however, is relatively expensive since the manufacture of correspondingly permanent magnets is very complicated.

In order to reduce the costs of manufacture, attempts have already been made with the aim to fix a number of permanent magnets around an inner magnetic conductive piece. This, however, requires a precise treatment of the surface of the permanent magnets and of the magnetically conductive piece, and thus the reduction of the costs of manufacture is very poor.

BRIEF SUMMARY OF THE INVENTION

It is an object of the invention to provide a stator for an electrical machine which may be manufactured with tight tolerances and at relatively low costs.

Another object of the invention is the provision of a method of manufacture for such a stator.

Those and other objects are achieved by a stator having a permanent magnet system comprising at least four permanent magnets cylindrically shaped at its outer surface, and an equal number of mangetically conductive link means, each of which abuts the inner surface of two adjacent permanent magnets. Such a stator allows a correct centering of the permanent magnets when manufacturing the same, since these may be shifted with respect to the link means before the latter are mounted or fixedly secured thereto.

The permanent magnets and the link means are preferably secured to one another and to the end face plate by an adhesive. By this, all the main elements of the stator may be fixed together in a single step of manufacture, and tight tolerances may be achieved.

The radially inner surfaces of the permanent magnets preferably are plane, and so should be the radially outwardly facing surfaces of each of the link means, which in a preferred embodiment have two plane outer surfaces enclosing an angle with one another. Thus, an intimate contact of the permanent magnets on the one hand and of the link means on the other hand irrespective of any shifting of these parts against one another is achieved, so that a low magnetic resistance between the abutting surfaces will result.

In a method for manufacturing a stator according to the invention, the permanent magnets are inserted into the interior of a cylindrical sleeve, the inner diameter of which corresponds to the desired outer diameter of the permanent magnet system. The surfaces of the permanent magnets which are to be secured to the link means are covered with an adhesive and pressed into their correct position against the inner surface of the sleeve until the adhesive has cured. Thereupon, the thus formed permanent magnets are secured to the first end plate.

Securing the permanent magnets with the first end plate and with the ferromagnetic flux return means may be realized by bonding and may be performed concurrently with securing the permanent magnets in order to further simplify the manufacture of the stator.

If the manufacture is realized with the aid of a sleeve, the crosssectional dimensions of which correspond to the desired dimensions of the air gap, all parts influencing any tolerance, may be exactly adjusted. This is extremely favourable if a ferromagnetic flux return means is used which is provided with one or several longitudinal slots.

Alternatively, the permanent magnets may be secured to the first end plate by gluing or bonding, and the ferromagnetic flux return means may be pressed upon said first end plate.

BRIEF DESCRIPTION OF THE DRAWINGS

The invention will now be further described by way of non-limitative examples, with reference to the accompanying drawings, wherein FIG. 1 is an axial section taken through an electrical machine comprising a stator according to the invention;

FIG. 2 is a cross-sectional view taken along the line II—II of FIG. 1;

FIG. 3 is a cross-sectional view according to FIG. 2 of an alternate embodiment.

FIGS. 1 and 2 show a dc-motor, the stator of which generally comprises a cylindrical ferromagnetic flux return ring 1, a first end plate 2 and a permanent magnet system 3. The first end plate 2 forms a disk of aluminum which is glued to the ferromagnetic flux return ring 1 at one end region thereof. A bearing 4 is provided, centered to and inserted into a recessed hole of the first end plate 2 and receives a shaft 5 which supports a cup-shaped rotor 6.

Figure 4:
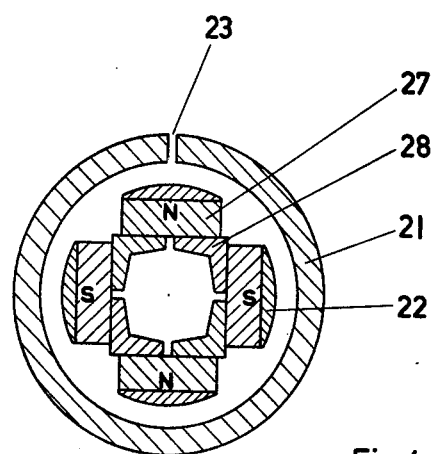
FIG. 4 is a cross-sectional view according to FIG. 2 of a third embodiment.

The permanent magnet system comprises four permanent magnets 7 having a rectangular, plane lower or inner surface and a cylindrically shaped outer surface, and which are circumferentially equally distributed. Each pair of adjacent permanent magnets 7 is bonded to a link means 8 made of a ferromagnetic material. The radially outer surface of each link means and the radially inner surfaces of the permanent magnets 7 are cylindrically shaped and have the same radius of curvature.

As may be seen from FIG. 2, the adjacent permanent magnets 7 have a clearance from one another in order to avoid a magnetic shunt.

The side face of the electrical machine lying opposite to the first end plate 2 is closed by a second end plate 9 which is provided with a central bearing 12 and supports brush means 10 which are connected to terminals 11.

In the manufacture of such a stator, a sleeve is used, the radial dimensions of which correspond to the dimensions of the desired air gap. The sleeve is inserted into the interior of the ferromagnetic flux return ring 1, which may already be fixedly secured to the first end plate or which may loosely be put onto the same after applying a layer of an adhesive. The permanent magnets 7 are thereupon inserted into the sleeve, and the four link means 8, after having been coated with an adhesive, are pressed against the permanent magnets 7, the pressure being maintained until the adhesive has cured. Thereupon, the sleeve is withdrawn from the finished permanent magnet system. Such a method of manufacture ensures that the outer surface of the permanent magnet system is exactly coaxial to the inner surface of the ferromagnetic flux return ring. By this, an exactly dimensioned air gap is formed, the width of which corresponds to the width of the sleeve. Even if a ferromagnetic flux return ring and permanent magnets having high toleranced surfaces are used, the finished stator will have an optimum and low toleranced configuration of the air gap.

The stator may be manufactured alternatively by at first mounting and bonding the permanent magnet system and securing the same to the first end plate 2 and by thereupon connecting the thus formed unity to the ferromagnetic flux return ring 1. The simpliest way of manufacture, however, consists in securing all parts to one another at the same time, especially by gluing or bonding.

In the embodiment as shown in FIG. 2, the link means 8 will completely abut the permanent magnets 7 only in a distinct position of these parts with respect to one another. If the axis of a link means is not in parallel to the axis of a permanent magnet 7, there is only a contact between these parts along a line or two instead of an area contact. In view of the tolerances which are encountered in practice, the magnetic parameters of the permanent magnet system will not be adversely affected.

FIG. 3 shows an extremely favourable embodiment, in which the butting surfaces of the permanent magnets 17 and of the link means 18 are plane and enclose an angle equal to $360/n$, $n$ being the number of magnets. With such an embodiment, neither variations of the radial position nor canting of the magnets about a radius as axis of rotation lead to an increase of the magnetic transfer resistance between the permanent magnets 17 and the link means 18. This construction is extremely favourable for larger stators which apparently have greater tolerances, and is ideally suited for a four-magnet arrangement.

FIG. 4 shows a cross-sectional view of a further embodiment, wherein the permanent magnets consist of parallelepiped-shaped permanent magnets 27 with pole pieces 22 fixed thereto which have an outer cylindrically curved surface.

The ferromagnetic flux return ring 21 is provided with a longitudinal slot 23 in order to compensate for tolerances of the diameter of the ferromagnetic flux return ring.

The link means 28 corresponds to the link means 18 of FIG. 3.

What is claimed is:

1. A stator for an electric motor, said stator having an outer ferromagnetic flux return means, a permanent magnet system positioned within said flux return means, and a first end plate supporting said flux return means and said permanent magnet system, said permanent magnet system comprising:

at least four spaced permanent magnets, each of said magnets having a cylindrically shaped outer surface portion and an inner surface; and at least four spaced ferromagnetic flux linking means, the number of said linking means being equal to the number of said magnets, each of said linking means having an outer surface corresponding in shape to said inner surface of said magnets, each of said linking means extending between, and having its outer surface secured to said inner surfaces of two adjacent ones of said spaced permanent magnets, whereby said permanent magnets and said linking means may be correctly spaced before being secured to each other and to said first end plates.

2. The permanent magnet system of claim 1 wherein each of said permanent magnets includes a pole piece, each said pole piece forming said outer cylindrical surface portion of and being secured to one of said spaced permanent magnets.

* * * * *